United States Patent [19]

Vallhonrat

[11] Patent Number: 4,491,916
[45] Date of Patent: Jan. 1, 1985

[54] LARGE VOLUME, HIGH SPEED DATA PROCESSOR

[75] Inventor: Juan B. Vallhonrat, Houston, Tex.

[73] Assignee: Litton Resources Systems, Inc., Alvin, Tex.

[21] Appl. No.: 517,384

[22] Filed: Jul. 27, 1983

Related U.S. Application Data

[63] Continuation of Ser. No. 328,039, Dec. 7, 1981, abandoned, which is a continuation of Ser. No. 091,166, Nov. 5, 1979, abandoned.

[51] Int. Cl.³ .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,700,820 | 10/1972 | Blasbalg et al. | 370/82 |
| 3,735,365 | 5/1973 | Nakamura et al. | 364/200 |
| 3,753,234 | 8/1973 | Gilbert | 364/200 |
| 3,755,785 | 8/1973 | Kirk | 364/200 |
| 3,810,114 | 5/1974 | Yamada et al. | 364/200 |
| 3,811,014 | 5/1974 | Seitz | 370/80 |
| 3,851,104 | 11/1974 | Willard et al. | 370/85 |
| 3,919,693 | 11/1975 | Anderson | 364/200 |
| 3,993,981 | 11/1976 | Cassarino, Jr. | 364/200 |
| 4,032,899 | 6/1977 | Jenny | 364/200 |
| 4,038,642 | 7/1977 | Bouknecht et al. | 364/200 |
| 4,047,246 | 9/1977 | Kerllenevich | 364/200 |
| 4,067,058 | 1/1978 | Derchak | 364/200 |
| 4,075,691 | 2/1978 | Davis et al. | 364/200 |
| 4,101,969 | 7/1978 | Lawson | 364/900 |
| 4,110,823 | 8/1978 | Cronshaw | 364/200 |
| 4,133,030 | 1/1979 | Huettner et al. | 364/200 |
| 4,151,590 | 4/1979 | Azegami | 364/200 |
| 4,181,936 | 1/1980 | Kober | 364/200 |
| 4,204,208 | 5/1980 | McCarthy | 364/900 |
| 4,215,400 | 7/1980 | Denko | 364/200 |
| 4,228,496 | 10/1980 | Katzman | 364/200 |
| 4,264,954 | 4/1981 | Briggs et al. | 364/200 |
| 4,363,094 | 12/1982 | Kaul et al. | 364/200 |

FOREIGN PATENT DOCUMENTS 904334  8/1962  United Kingdom ............... 106/

OTHER PUBLICATIONS

Buerge, "Dynamic Slot Allocation in Data Transmission System", IBM Tech. Disc. Bulletin, vol. 19, No. 7, 12/1976.
Proceedings of the IEEE NAECON 78, pp. 114-120.

*Primary Examiner*—James D. Thomas
*Assistant Examiner*—David Y. Eng

[57] ABSTRACT

A data processing system having an architecture that will allow high-speed direct device-to-device data transfers without the necessity of first detouring the data through a computer memory. The system consists of a host computer and a remote signal processing subsystem connected thereto. A Direct Device Access Bus and a plurality of data processing devices are provided. A controller associated with a Signal Processing Subsystem supervisor, selectively interconnects desired ones of a set of data processing devices via the Direct Device Access Bus to provide direct communication between the selected devices within a set. Several sets of devices can be serviced concurrently by the technique of dynamic time slot allocation.

6 Claims, 8 Drawing Figures

LARGE VOLUME, HIGH SPEED DATA PROCESSOR

This application is a continuation of application Ser. No. 328,039, filed 12/07/81, now abandoned, which is a continuation of Application Ser. No. 091,166, filed 11/5/79 now abandoned.

BACKGROUND OF THE INVENTION

1. Field of the Invention

This invention discloses a novel digital computer architecture designed to process large blocks of data wherein the same operation or sequence of operations is performed on all of the elements which make up the data block.

2. Description of the Prior Art

Conventional, general-purpose computer systems typically include a memory, central processing unit (CPU) and one or more input-output (I/O) channels with a plurality of peripheral devices. The central element in all data-processing transactions is the memory. The CPU communicates to and from the memory. Each peripheral device communicates via its I/O channel to the memory. For example, to transfer the contents of a magnetic tape record to an array processor in order to perform certain arithmetic operations on the data, the record from the magnetic tape must be transferred to the computer memory and thence from the computer memory to the array processor. That single transaction requires two data transfers. The first transfer results in a write to the computer memory from tape; the second transfer results in a read from memory to the array processor. In essence, the computer data-transfer bandwidth has been cut in half because of the two transfers required by a single transaction.

Typically, peripheral devices such as a magnetic tape drive, transfer data at a constant rate. The I/O channel to which a device is connected and the memory to or from which data are being transferred must be prepared to transmit or receive data at the rate required by the device, otherwise, an overrun condition will occur. Devices exhibiting that characteristic are defined as "I/O Synchronous" devices. On the other hand, a random access bulk storage memory that can tolerate a variable I/O transfer rate (not to exceed its maximum cycle time of course) may be classified as an "I/O asynchronous" device.

In conventional computer systems, the reason for routing all transactions through the computer memory is that typically both the source and receiver peripheral devices involved in a transaction, are of the I/O synchronous type. The computer memory acts as a buffer between the source and receiver peripheral devices.

In the example given earlier, the array processor is a device which has its own memory and it therefore behaves as an I/O asynchronous peripheral device. Theoretically, as far as synchronization of data transfer rates is concerned, data could be transferred directly from the magnetic tape drive to the array processor. In practice, known conventional computer architectures do not allow direct device-to-device transfers.

In signal processing in general and in seismic data processing in particular, large blocks of data are processed wherein the same operation is performed on all of the data elements that make up the data block. Therefore, only a relatively small amount of logic and control is required for a given block of computation that is to be performed on each of a very large number of data values. By contrast, business data processing, for which most general purpose computers are designed, requires relatively large amounts of logic and decision making for relatively small amounts of computation.

It is an object of this invention to provide a data processing system having novel architecture that will allow direct device-to-device data transfers without first detouring the data through memory.

SUMMARY OF THE INVENTION

In a preferred embodiment of this invention, the improved data processing system includes a host computer having a CPU, associated memory modules, and peripheral devices such as mass storage media, all interconnected by appropriate data buses. A remote Signal Processing Subsystem is coupled to the host computer by a Signal Processing Subsystem Supervisor. A Direct Device Access Bus and a plurality of data processing devices are provided. A controller associated with the Signal Processing Subsystem Supervisor, selectively interconnects desired ones of a set of data processing devices via the Direct Device Access Bus to provide direct device-to-device communication between the selected devices of a set. One of the devices of a set is considered to be a source device and the other device or devices are considered to be a receiver device(s).

In accordance with an aspect of this invention the controller schedules concurrent parallel multiple-task, direct device-to-device data transfers between the numbers of each set of a plurality of sets of devices by dynamic time slot allocation.

In another aspect of this invention, either the source or the receiver device(s) of each set is an asynchronous device.

In accordance with another aspect of this invention, the Signal Processing System Supervisor enables transfer of data between a transmitter and a plurality of receivers in a parallel multiple-record transfer mode.

In accordance with yet another aspect of this invention, serial split-record data transfers are enabled by a command/data chaining technique.

In accordance with a further aspect of this invention, means are provided for establishing a plurality of time slots. The time slots are grouped into frames. The width of a frame in terms of time slots is varied in accordance with the number of sets of devices currently being serviced.

In accordance with another aspect of this invention, each peripheral device of a set of such devices is connected to the Direct Device Access Bus by a General Purpose Device Adapter. The adapters are interconnected with the Signal Processing Subsystem Supervisor by a command/control bus. In response to signals from the supervisor, a programable micro-controller in each General Purpose Device Adapter activates its attached device and enables direct device-to-device data transfers between selected devices of a desired set.

In a further aspect of this device, the General Purpose Device Adapter includes an input/output data board for transferring data between the direct device access bus and the peripheral device connected to the General Purpose Device Adapter. The data board also includes a FIFO memory for absorbing minor variations in data transfer rates between devices and a data-word reformatting means.

In yet another aspect of this invention, means are provided for assigning a transaction code to the General Purpose Device Adapters that are to participate in each one of a plurality of data transfers. Means are also provided for monitoring the available time slots for use in multiple data-transfer operations. The transaction codes are tabulated and indexed against the respective available time slots.

In a further aspect of this invention the command protocol is separate and distinct from the data transfer protocol and operate asynchronously with respect to each other.

In yet another aspect of this invention, the host computer transmits groups of Sypervisor Command Packets to the Signal Processing Subsystem Supervisor. Each group of command packets defines a different transaction. Selected Supervisor Command Packets are transformed into Device Command Packets by the Supervisor. In response to a group of active and pending Supervisor Command Packets the Supervisor establishes a plurality of direct device-to-device data transfers independently of intervention by the host computer.

In another embodiment of this invention, the Signal Processing Subsystem Supervisor establishes direct data transfers between a device in the Signal Processing Subsystem and the host computer, independently of multiple tasks that may be currently underway in the subsystem.

In another embodiment of this invention, the Signal Processing Subsystem Supervisor establishes serial split-record data transfers between a transmitter and a plurality of different receivers.

BRIEF DESCRIPTION OF THE DRAWINGS

The benefits and features of this invention will better be understood by reference to the accompanying description and the drawings wherein.

DETAILED DESCRIPTION OF THE INVENTION

Figure 1:
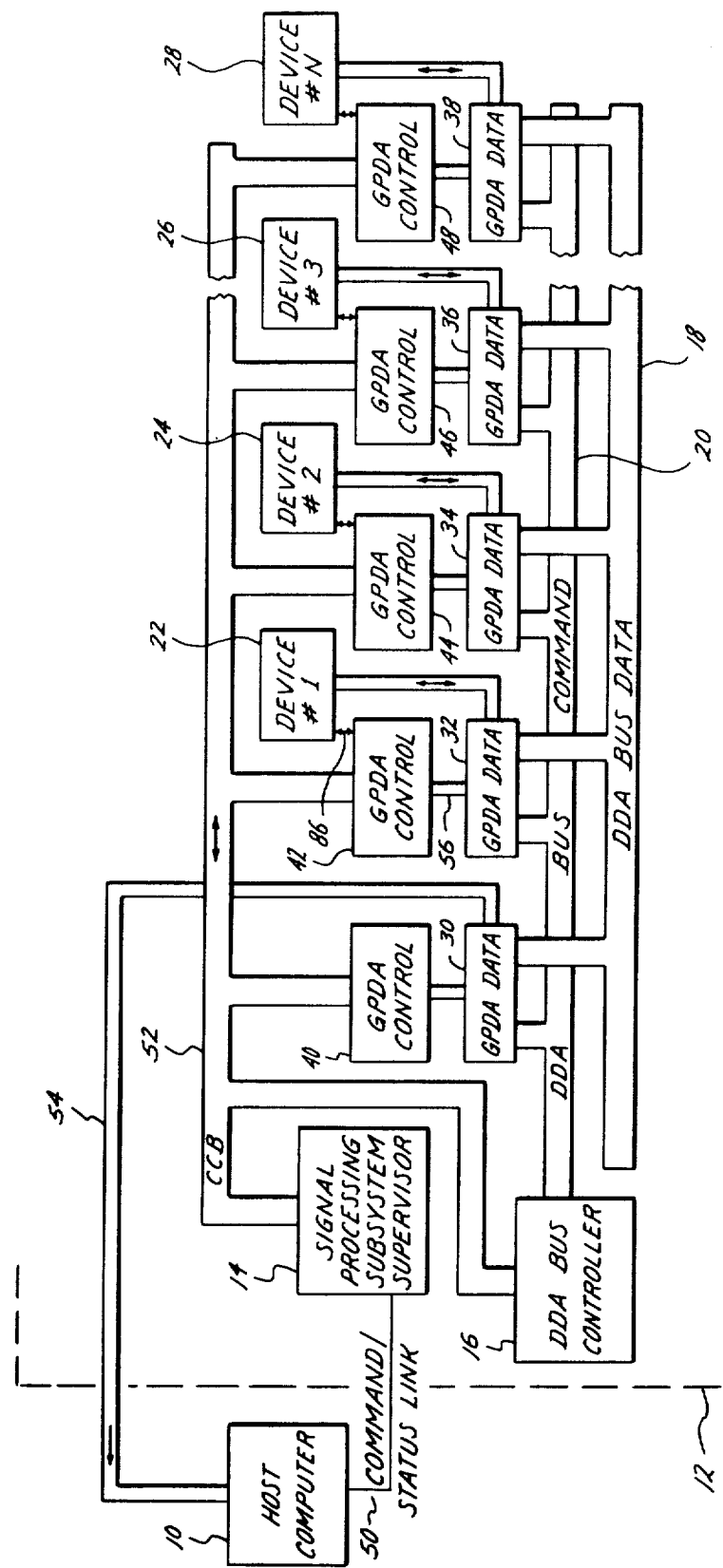
FIG. 1 is a block diagram of the Large-Volume, High-Speed Data Processor.

Referring now to FIG. 1, the Large Volume, High Speed Data Processor consists of a host computer 10 and a Signal Processing Subsystem (SPS) 12, shown enclosed by dashed lines. The host computer may be any conventional computer having a CPU, large-capacity memory with the usual peripheral devices such as a disc drive, tape drives, line printer, console terminal, card reader, etc. A preferred computer system is that VAX 11/780 with at least 1.0 megabytes of memory, made by Digital Equipment Corporation of Maynard, Mass.

The SPS is a special purpose data processing subsystem designed for efficient handling of high volume, high density data. It achieves that purpose by means of an internal high-speed, time-multiplexed data bus that enables parallel multiple direct device-to-device data transfers between a plurality of peripheral devices on a concurrent basis.

Signal Processing Subsystem 12 consists of:
1. An SPS Supervisor (SPSS) 14;
2. A Direct Device Access Bus Controller 16;
3. A Direct Device Access Bus (DDA Bus) consisting of a set, 18, of thirty two data lines, and a set, 20, of sixteen control lines including clocks, control, transaction-code address and parity lines;
4. A plurality of peripheral devices 22-28 such as magnetic tape drives, disc drives, array processors, and demultiplexing memories;
5. A plurality of General Purpose Device Adapters (GPDA) which interface the respective devices to the DDA Bus and are the basic input/output controllers for the system. A GPDA consists of a data section such as 30-38 and a control section such as 40-48 that adapt, under firmware control, a given GPDA to the device it is to service. Fifteen or more such GPDAs may be employed although only four are shown;
6. A Control/Status line 50 for interfacing the SPSS with the host computer;
7. A Command/Control Bus (CCB) 52 for interfacing the SPSS with the devices via the GPDAs; and
8. A Data Interface Bus 54, for transferring data from the DDA Bus directly to host computer 10.

From a hardware standpoint, SPS 12 is a stand-alone system although within the overall framework it is controlled by the host computer 10. Control from the host computer 10 is transmitted in the form of Transaction Command Packets (TCB), to be discussed below, over Control/Status line 50, in serial order.

The SPS Supervisor (SPSS) 14 functions as a data flow controller, controlling the data transfers on the DDA Bus under the supervision of the host computer. Its main function is to take Transaction Command Packets from the host computer, transform them into individual Device Command Packets for each of the various devices on the DDA Bus, and to route these commands to the correct device. The system is able to open and close data paths as required. It is also used to down-load firmware into the DDA Bus Controller and the GPDAs.

A Transaction Command Packet (TCP) consists of a series of Supervisor Command Packets (SPC) that instruct the SPS Supervisor how to complete a transaction to do a desired quantity of work. The Supervisor then transforms selected SCPs into Device Command Packets (DCP) that exercise control functions, through the GPDAs, over the peripheral devices.

Device Command Packets are sent from the SPSS to the DDA Bus Controller and GPDAs via CCB 52. Status messages from the devices are routed back to the SPS via the CCB.

The Direct Device Access Bus Controller 16 is the link between Direct Device Access Bus 18, 20 and SPSS 14. Control information is passed to the DDA Bus Controller via the CCB. The controller interprets this information and sets up or terminates a device-to-device data path on the DDA Bus. The DDA Bus controller can also enable multiple device-to-device transfers on a dynamic time-slot allocation basis. Thus, the command protocol is separate and distinct from the data-transfer protocol and they function asynchronously with respect to each other.

The 48-bit wide Direct Device Access Bus contains a 32 bit wide data path, 18, with a 16-bit wide bus, 20, including byte parity, clocks, control, and address lines. It is a time multiplexed bus capable of multiple device-to-device transfers at a maximum aggregate transfer rate of 40 megabytes of data per second.

With regard to data transfers over the two sets of DDA Bus lines 18, 20, three terms must be defined; a time slot, a transaction aperture and a frame. A time slot is a 100 ns period during which a specific data transfer over the DDA Bus is permitted to take place. A transaction aperture has a width equal to the number of time slots required to complete a transaction. A frame is the time period between repetitions of any specific slot. If four multiplexed data transfers are taking place, the frame width will be 400 ns and there will be four slots/frame. An unusual feature of the DDA Bus is that data paths are only created when they are needed. The Bus Controller under command from the SPSS dynamically creates a time-multiplexed slot on the bus for every required data transfer. Thus if three independent data transfers are called for, the controller opens up three slots. If another transfer is requested then the number of slots/frame is increased to four. Thus, the frames are of variable length. When any transfer terminates, its slot is removed. Due to the overlapped bus protocol, a minimum of two slots/frame are required.

A maximum limit of fifteen attached devices plus the DDA Bus Controller has been arbitrarily established. However, the system is in no way limited to that number of peripherals. As is well known, a peripheral unit, such as one or more tape drives includes a dedicated controller for formatting and scheduling incoming and outgoing data. For purposes of this disclosure, both the peripheral unit and its dedicated controller is considered to be a single peripheral device. Since the peripherals always work in sets, i.e. there must be a data source and at least one destination, the maximum normal effective frame width for fifteen devices is seven time slots. A key feature of the DDA Bus is that it enables device-to-device transfers and that these transfers are activated without any arbitration protocol from the host computer.

As its name implies, the General Purpose Device Adapters are designed to interface any peripheral device to the DDA Bus. Physically all of the GPDAs are identical. The personality or characteristics of a given GPDA are determined by the firmware that is downloaded from the SPSS at system initialization time. The firmware provides each GPDA with all of the information that it needs to transfer data from the peripheral device to which it is connected across the DDA Bus. If a GPDA is removed from one device and connected to another, it is a simple matter to reprogram the firmware.

The purpose of the Signal Processing Subsystem is to perform multiple tasks of useful work with minimal intervention by the host computer. A transaction is defined as the performance of a desired task. A typical transaction might consist of transferring a multiplexed data stream from a seismic magnetic field tape to a demultiplexing memory and thence to store the demultiplexed data on a disc for further processing. A demultiplexing memory, for example is disclosed in U.S. patent application 946,898, filed Sept. 28, 1978, now U.S. patent No. 4,224,474, issued Sept. 23, 1980, and assigned to a sister firm of the assignee of this invention which is incorporated herein by reference.

A transaction is accomplished by sending a plurality of Supervisor Command Packets (SCP) from the host computer to the SPSS over the Control/Status Bus 50. An SCP contains all of the information required by the SPS to complete a requested action and a transaction contains all of the SCPs required to complete a single processing step, i.e. transfer of data from tape to a demultiplexing memory. SCPs provide for data transfer operations, transaction modification, error recovery and status reporting.

Certain types of SCPs generate Device Command Packets (DCP) which are transmitted to the appropriate GPDA control modules over Command/Control Bus 52. A DCP contains information that is both general (i.e. applicable to all devices) and device specific. Information present in a DCP will be the source/destination transaction code, device comands, byte count for the block of data to be transferred, starting address for the data transfer.

Normally, several data transfer operations are conducted concurrently. Accordingly, a queue of several Transaction Command Packets is sent to SPS 12 from host computer 10. The SPSS 14 then accepts the transaction command packets and allocates the necessary resources to the various tasks to be performed in an orderly sequence. A resource is defined as a device such as a magnetic tape drive, a storage element such as a demultiplexing memory, or a data pathway such as a disc controller.

The overall operation of the system can be described, in a simplified way, as follows. Assume that ten thousand bytes of data are to be transferred to an array processor from a magnetic tape. An array processor, for purposes of this disclosure, is a device for performing a sequence of high-speed multiply/add operations for use in data correlation.

A TCP is sent from host computer 10 to SPSS 14. The SPSS then alerts a tap drive over CCB 52, designating it as a source or transmitter, assigns to it a specified transaction code and sets up a byte counter to a count of 10,000. The SPSS also designates the array processor as a receiver, assigns to it the same transcation code as the tape drive and the same byte count. At the same time, the SPSS tells the DDA Bus Controller that it is to place the assigned transaction code on the address lines of DDA Bus 20 at the first available time slot within a frame. In the meantime, the GPDAs associated with the tape drive and the array processor are looking for the transaction code to appear on the address lines of DDA Bus 20. During the first time slot, the transmitter recognizes his address; at the next time slot, if ready, he places his data in parallel on the DDA Bus data line 18 and transmits a transmit-acknowledge signal, TACK over one of the set of command lines 20. At the last time slot, the receiver, which has already recognized the transaction code, if ready, thereupon accepts the data from the transmitter and transmits a receive acknowledge signal, RACK. Each time that transmitted data are received, the byte counter in the transmitter is decremented. When the byte counter is exhausted, the transmitter sends a signal DONE back to the SPSS over a status line in CCB 52 and the transaction is terminated.

The above sequence of events will be discussed in more detail below in the separate detailed descriptions of each of the key elements of the system, namely the SPSS, the DDA Bus Device Access Bus.

Signal Processing Subsystem Supervisor

Signal Processing Subsystem Supervisor (SPSS) 14 may be a mini-computer such as the PDP 11/04 made by Digital Equipment Corporation, supra. SPSS 14 communicates with the host computer over control/status line 50. Basically, SPS 12 is controlled by commands from SPSS 14 which cause the DDA Bus Controller 16 to create or delete data paths on the DDA Bus data lines 18. SPSS 14 also sends commands to the GPDAs over CCB 52 which allows the CPDAs to use those paths.

Although the SPS Supervisor 14 is preferably a stand-alone unit with respect to the host computer, the Supervisor may also be resident in the host computer as software, firmware, hardware or a combination thereof. With that capability, in the event that SPS Supervisor 14 malfunctions, subsystem 12 may still operate albeit less efficiently. Conversely, if the host computer malfunctions, commands that would normally be downloaded from the host computer, may be entered directly into SPS Supervisor 14.

CCB 52 is a 56-line bus to which the DDA Bus controller 16 and all of the GPDAs are connected. Requests to open and close data paths are transmitted over this bus. The functions of these control lines are fully described in U.S. Pat. No. 3,710,324 and 3,815,099 which are incorporated herein by reference.

Interaction between the SPS Supervisor and the host computer as well as the management and allocation of resources is dependent on relatively slow, conventional programming logic. Once a set of devices (transmitter-receiver combination) has been assigned by the program logic to perform a specified task, high-speed, mass data transfers can take place across the DDA Bus without further intervention by the SPS Supervisor until the task is complete. All devices in the Signal Processing Subsystem have equal priority with respect to the CCB.

The host computer causes the SPS to do useful work, in an orderly manner without further intervention, by means of Transaction Command Packets. A Transaction Command Packet (TCP), transmitted from host computer 10 to SPSS 14 serially over command/status line 50, consists of at least four Supervisor Command Packets (SPS). There are five types of SCP. A TCP consists of a type 1, type 3, type 4 and either a type 2 or type 5 SCP.

The functions of the five SCP types are as follows:

Type 1—Device Queue specification. This is the first SCP in a transaction. It specifies the device queues necessary for the entire transaction.

Type 2—A type 2 SCP contains the information necessary to perform the data transfers requested in a transaction. The type 2 SCP specifies the source (transmitter) and destination (receiver) of the data and the parameters required by the devices. It is well to point out here that more than one receiver may receive data from a given transmitter at the same time. The byte count of the data to be transferred is included as well as the byte count or address of the next SCP to be activated. An error termination routine is specified.

Type 3—A type 3 SCP is used to terminate a process and is activated by a type 4 SCP. A type 3 SCP gathers information about the transaction such as success, failure, error parameters etc., and transmits these data to the host computer.

Type 4—A type 4 SCP provides instructions to the SPSS. There may be several kinds of Type 4 SCPs, depending upon the operation code. First is a use-count termination, i.e. execute a type 2 or a type 5 SCP a given number of times. For example, it might be required to transmit 5000 bytes of data from a source to a first destination and thereafter to transfer another 5000 bytes of data from that source to a second destination until the byte count is exhausted.

Second is a status termination. That is, do a type 2 or type 5 SCP until a certain status is attained. For example to read records in a tape file, the tape would be read until the End of File mark (status) is detected.

Third is an error termination such as a termination due to excessive parity errors.

Fourth is a test termination. This code is used when a SCP type 2 or type 5 must activate another SCP type 2 or 5.

Type 5—A type 5 SCP is used to perform single-device utility actions such as rewind a tape drive or initiate an array processor. Transactions that use multi-unit devices must begin with a type 4 SCP to verify not only that all the controllers needed are free, but also that the needed units on these controllers are not busy. Parameters include usage count device specification, device parameters and status (i.e. DONE, BUSY, ERROR).

It is evident, of course, that when several transactions are to be chained (to be discussed infra), then each SCP must bear a packet identification number.

Of the five SCPs, only a type 2 or type 5 SCP generate a Device Command Packet, now to be discussed.

The Signal Processing System Supervisor include a SCP to DCP transformer. The transformer converts SCPs that contain process specific parameters into DCPs that contain device specific information. The SCP to DCP transformer also decodes the error fields of the SCP and sets the appropriate flags for the required error routines.

A separate set of SCP is necessary for each function that is required of a pair of devices in order to complete a transaction. Thus, to read data from a magnetic tape file, the tape must be instructed to (1) advance to beginning of the file; (2) read the header bytes and transfer to a temporary storage; (3) read the data until the end of file mark; (4) rewind tape and stop. For this operation four separate sets of SCPs are required. The two read operations (2) and (3) require use of a type 2 SCP; operations (1) and (4) require a type 5 SCP.

As will be discussed later with respect to the GPDA control board, the above listed sequence of events may take place in proper sequence without intervention by the host computer. The process described is termed command/data chaining.

The standard command set for the GPDAs is as follows:

| COMMAND | CODE | DESCRIPTION |
| --- | --- | --- |
| READ | 0 | Transfer Data out of the Device |
| RITE | 1 | Transfer Data into the Device |
| SPFW | 2 | Space Forward |
| SPRV | 3 | Space Reverse |
| ERAS | 4 | Erase |
| WEOF | 5 | Write "End of File" Mark |
| RWOL | 6 | Rewind on Line |
| RWOF | 7 | Rewind off Line |
| ABRT | 8 | Immediate Stop of all Activity |
| STOP | 9 | Stop at the end of the current DCP |
| LOAD | 10 | Load the GPDA Firmware |

-continued

| COMMAND | CODE | DESCRIPTION |
|---|---|---|
| DIAG | 11 | Place the GPDA into a Diagnostic Mode |
| STRD | 12 | Read Status |
| STWT | 14 | Write Status |
| OFFL | 15 | Take the Device off Line |
| STRT | 16 | Start a Device |
| FUNC | 17 | Device Dependent Function |
| RSET | 18 | Reset The Device |
| BOOT | 19 | Perform a Bootstrap Function |
| NOOP | 20 | No Operation |

It should be noted that these commands appear only in the SCPs. The actual device dependent commands necessary to operate a given peripheral are generated via the SCP to DCP transformer. Commands are delivered to the GPDAs via DCPs over CCB 52. All SPS I/O will be initiated by supplying the proper command value to the appropriate GPDA register.

DCPs are the structures that allow the general purpose SCPs to control specific devices. All the information necessary for the complete control of any SPS peripheral is contained within its associated DCP.

There are two ways of transferring the DCP from the SPSS to a GPDA. For devices requiring a minimal-length DCP, the device adapter will have all of its registers directly mapped into the SPSS I/O address space. For devices which require a longer DCP, only the first four registers will be mapped into SPSS I/O address space. These registers will include a GPDA control/-status register, a DCP block length register, a DCP block starting address register, and a DCP identification register. A direct memory access operation will be performed using the information in these registers to transfer the DCP.

Each GPDA will have allocated 64 bytes of address space in which to locate its registers. The use of this address space except for one word per GPDA, namely a control word for activating the GPDA control board, will be determined by the GPDA firmware.

The DCP will contain information that is both general, applicable to all devices, and device specific. The general information will be contained in the first portion of the DCP.

Any information that applies to the control of the GPDA itself will be contained in the first word or words of the DCP. The next words of the DCP will contain information to link a long DCP to the GPDA control word.

The final portion of the DCP will be the control bits that are transferred directly from the GPDA to the device controller which is, for all practical purposes, a part of the device itself. It will appear in the DCP in the same order as the addressing of the registers within the device controller. This information will include data such as: device commands, byte count for the data transfer, start address for the data transfer, track and sector addressing for discs, tape rewind, read, write, etc.

Direct Device Access Bus

The Direct Device Access Bus (DDA Bus) 18, 20 is the main bus of the signal processing subsystem over which all peripheral data are transferred. Data transfers across the DDA Bus are made only between those General Purpose Device Adapter data boards that are enabled by the DDA Bus-Controller 16. All of the GPDAs in the SPS have equal priority with respect to the DDA Bus. The DDA Bus consists of 48 lines assigned as follows wherein there is a set, 18, of 32 data lines and a set, 20, of 16 command lines:

| NAME | NO OF LINES | MNEMONIC | FUNCTION |
|---|---|---|---|
| Data | 32 | HDAT | DDA Bus Data Transfer |
| Address | 4 | HADD | To initiate a DDA Bus data transfer |
| Address Parity | 1 | HADDP | DDA Bus Address Parity Bit |
| Data Clock High | 1 | DCLKH | 100 ns clock to synchronize data transfers |
| Data Clock Low | 1 | DCLKL | Data Clock Return |
| Data Parity | 4 | HDATP | Data Byte Parity |
| Transmit Acknowledge | 1 | TACK | Data Good Verify to Receiver |
| Receive Acknowledge | 1 | RACK | Data Received verify to Transmitter |
| End of Data | 1 | HENDAT | End of Data |
|  | 2 |  | Spares |

All lines go to all GPDAs in the subsystem 12. The address lines, address parity and data clock lines originate from the DDA Bus Controller 16, and are unidirectional. All other lines are bidirectional, and do not go to the DDA Bus Controller.

Communication between any two GPDAs such as 32 and 34 is synchronous with the DDA Bus data clock, and is initiated by the DDA Bus Controller 16 by placing a four-bit transaction code on the DDA Bus address lines. Both GPDAs, one a transmitter and one a receiver, recognize the same transaction code. The transmitter places data on the data lines and indicates data are good with TACK. The receiver receives the data and responds with RACK.

A complete DDA Bus data transfer requires three, 100-ns time slots. The DDA Bus Controller, however, only requires one time slot to place the transaction code on the address lines of the bus. During the second time slot, while the transmitter is placing data on the bus, the DDA Bus Controller may place another transaction code on the address lines of the bus to initiate a data transfer between another pair of GPDAs. By overlapping time slots in this manner, a 40 megabyte aggregate transfer rate over the DDA Bus is achieved, i.e. one 4-byte word transfer is possible every 100 ns.

A detailed description of the timing for DDA Bus data transfers is given in the section titled "GPDA Data Board" to follow.

Direct Device Access Bus Controller

The Direct Device Access Bus controller 16 is the link between the Direct Device Access Bus 18, 20 and SPS Supervisor 14. Control information is passed to the DDA Bus Controller via the CCB 52. The controller interprets this information and sets up a device-to-device data path on the DDA Bus. The Controller can also control multiple device-to-device transfers on a dynamic time-multiplexed basis. Device access to the DDA Bus is implemented with dynamic time slot allocation. The term "Dynamic Slot Allocation" is defined to mean that technique whereby data-transfer time slots are created only when and where needed. The number of data transfer slots per frame is under continual adjustment so that when a transaction is complete, the slot or slots allocated to that transaction are removed. As a new transaction is initiated, new slots are created. A specific device is not necessarily assigned to a specific time slot or transaction code on a permanent basis. This technique differs from conventional Time Division Multiplex (TDM) systems where the frame width is fixed as are the number of time slots per frame and the allocation of a specific device to a specific time slot.

The operation of the Direct Device Access Bus is controlled by transaction codes supplied at a cycle time of 100 ns in a polling type sequence. The source and destination devices respond, starting at the time slot allocated.

Communication with the CCB is preferably controlled by a microprocessor such as the 8×300, made by Signetics Inc. of Sunnyvale, CA. It does the handshaking with the bus, then interprets the command and passes the needed information to the hardware.

There are sixteen possible time slots with a transaction code and a slot flag associated with each one. The transaction codes are stored in two 16-by4 RAMs. The slot flags are stored in two 8-bit addressable latches.

The 8×300 loads transaction codes into the RAM and raises or lowers slot flags under commands from the SPS Supervisor 14. The hardware logic looks at the raised slot flags and puts the associated device address on the bus in a sequential manner.

Figure 2:
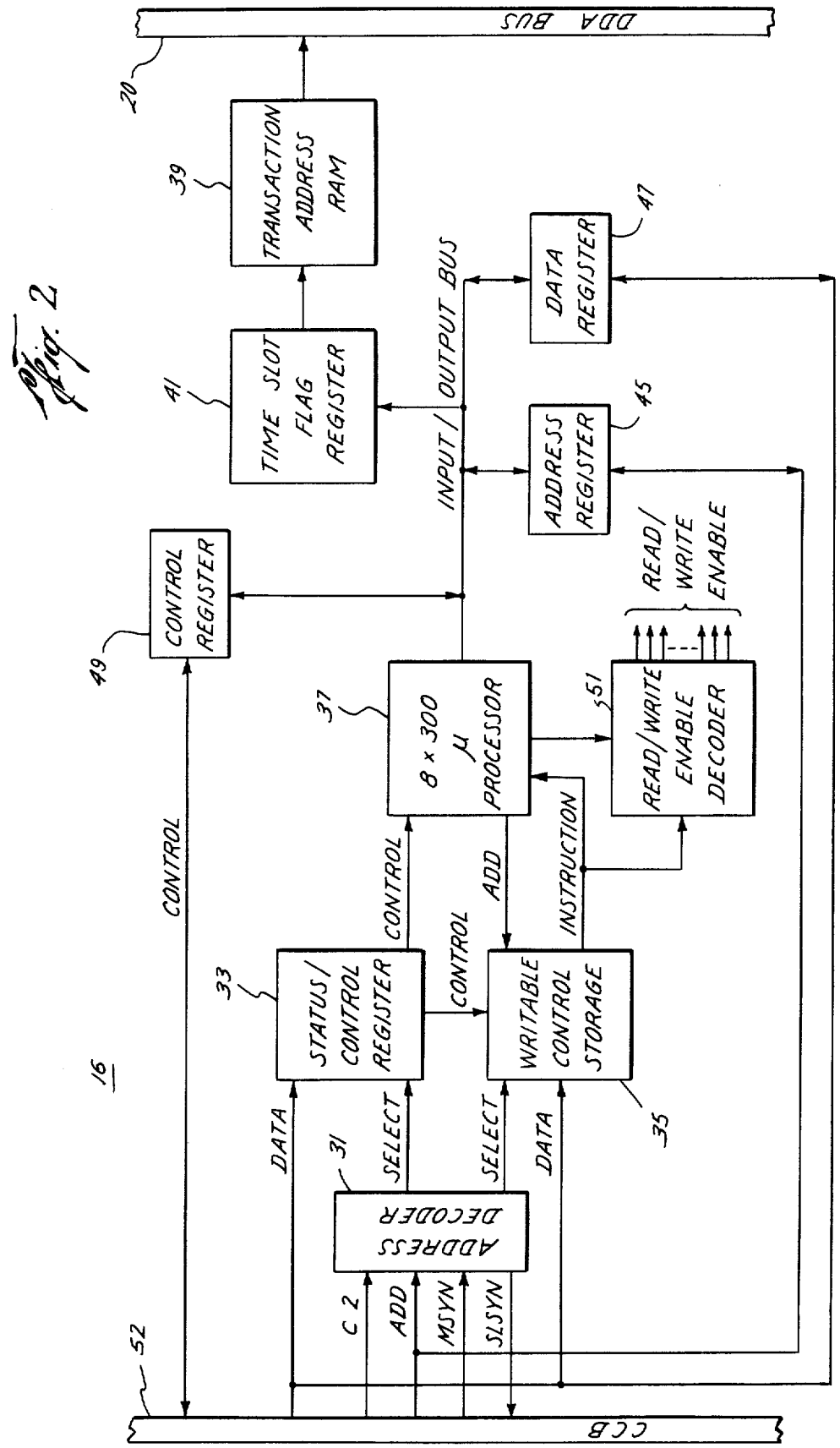
FIG. 2 is a detailed drawing of the Direct Device Access Bus controller.

Referring now to FIG. 2, there is illustrated in detail the components that make up the Direct Device Access Bus Controller 16, FIG. 1.

Address decoder 31 has inputs C2 and ADD.

Signals over line C2 determine whether data are to be read from or written into address decoder 31. Line ADD identifies the DDA Bus Controller 16 as being the receiver of the command presently on the command/data lines of the CCB. It also defines the destination for the command/data words as being the status/control register 33 or the writable control-storage 35.

It should be understood at this point, that the so-called DATA line does not necessarily carry data in the sense of numerical data signals that are to be processed such as are transferred between devices over the DDA Bus. In the context of FIG. 2 the DATA lines transmit command, control and status words such as system intialization parameters and Device Command Packets.

Writable control-storage 35 and microprocessor 37 are inert until they are activated by certain control bits in the status/control register 33. Accordingly, the first command word from SPS Supervisor 14 over the DATA Bus of CCB 52 must be directed to status/control register 33. Status/control register 33 then activates writable control-storage 35 and microprocessor 37. When writable control-storage 35 has been loaded, microprocessor 37 can then exercise the functions necessary to control and transfer data between devices over the DDA bus.

Certain registers are connected to the microprocessor 37 over the input/output Bus. Read/write enable decoder 51 sends read/write instructions to specific registers under the control of insructions from microprocessor 37.

Initially, command/data and addresses are presented to the DDA Bus Controller by the SPS Supervisor on a request/acknowledge basis. Accordingly lines MSYN and SLSYN are provided. MSYN active to address decoder 31, says that data are present on the CCB 52. Upon receiving the data, address decoder 31 responds with SLSYN. After microprocessor 37 and writable control storage 35 have been activated, handshaking between DDA Bus Controller 16 and CCB address space, for addresses defined by the microprogram in the writable control-storage 35, is controlled by control register 49.

The SPS Supervisor 14 monitors the availability of resources needed for the respective transactions that are to take place. It assigns a specific transaction code and a specific time slot to each set of peripheral devices that will participate in a transaction. For that purpose, the Supervisor decodes the unit address of the receiver GPDA and assigns that address as a transaction code for both the transmitter GPDA and the receiver GPDA. The SPS Supervisor 14 then requests from DDA Bus Controller 16 the number of the next available time slot from time slot flag register 41. The Supervisor then sets the flag, corresponding to the designated time slot, in time slot flag register 41. At the same time, the transaction code is entered into transaction-code RAM 39, indexed according to the assigned time slot number. As each time slot appears, if its flag is raised, the corresponding transaction code is placed on the address lines of the DDA Bus.

Address register 45, data register 47 and control register 49 provide intercommunication between the input/output bus and Command Control Bus 52. These registers are provided so that the commands and status that were downloaded into status/control register 33, writable control-storage 35 and microprocessor 37, can be read back for diagnostic verification. They also provide areas for receiving and storing time slot and transaction-code allocations.

General Purpose Device Adapter

A General Purpose Device Adapter such as 32 serves as a common point for control signals to and from the SPS Supervisor 16, the data stream on the DDA Bus between devices and the control and data signals flowing to and from a device at a data port. Peripherals connect to the SPS at a data port. The GPDA data port, under firmware control and sequential switching, can be made to be 8, 16 or 32 bits wide as will be discussed later. The GPDA personality or characteristics are determined by the firmware down-loaded from the SPSS into a writable control-storage during the system initialization. The GPDA supports command chaining to be described later herein and will respond to a standard command structure. A GPDA is required for every peripheral device connected to the DDA Bus.

The GPDA consists of two boards, a control board such as 42 and a data board such as 32 with a command-status interface such as 56 between the two boards. There are three interfaces to the GPDA as a whole, namely, the CCB, the DDA Bus and the data port.

The control board interfaces to the CCB, the data port and the data board. The data board interfaces to the DDA Bus, the data port and the control board.

A data port is the communication path between a GPDA and a peripheral device. It is not a bus, that is, only one device may be connected to one GPDA at a time. However, since the peripheral device may be one of many types, the data port includes 63 lines, to be discussed later, that are shared between the GPDA control board and the data board.

The GPDA command-status interface 56 is the control link between the GPDA control board and the GPDA data board. It consists of nineteen unidirectional lines, assigned as follows:

| NAME | NO OF LINES | FUNCTION |
|---|---|---|
| FIFO Control Command | 8 | Control-Data Lines |
| FIFO Control Status | 8 | Control Status Lines |
| Command Enable | 1 | Enable to Load Command Register on Data Board |
| Data Enable | 1 | Enable to Load and Read Data Transfer Parameters Register on Data Board |
| Master Clock | 1 | Clock from Control Board |

The control-data lines are used to transfer control information from the GPDA control board to the data board. The control status lines are used by the GPDA control board to read status information from the data board. The other three lines are used to control the transfer of this information.

GPDA Control Board

Figure 3:
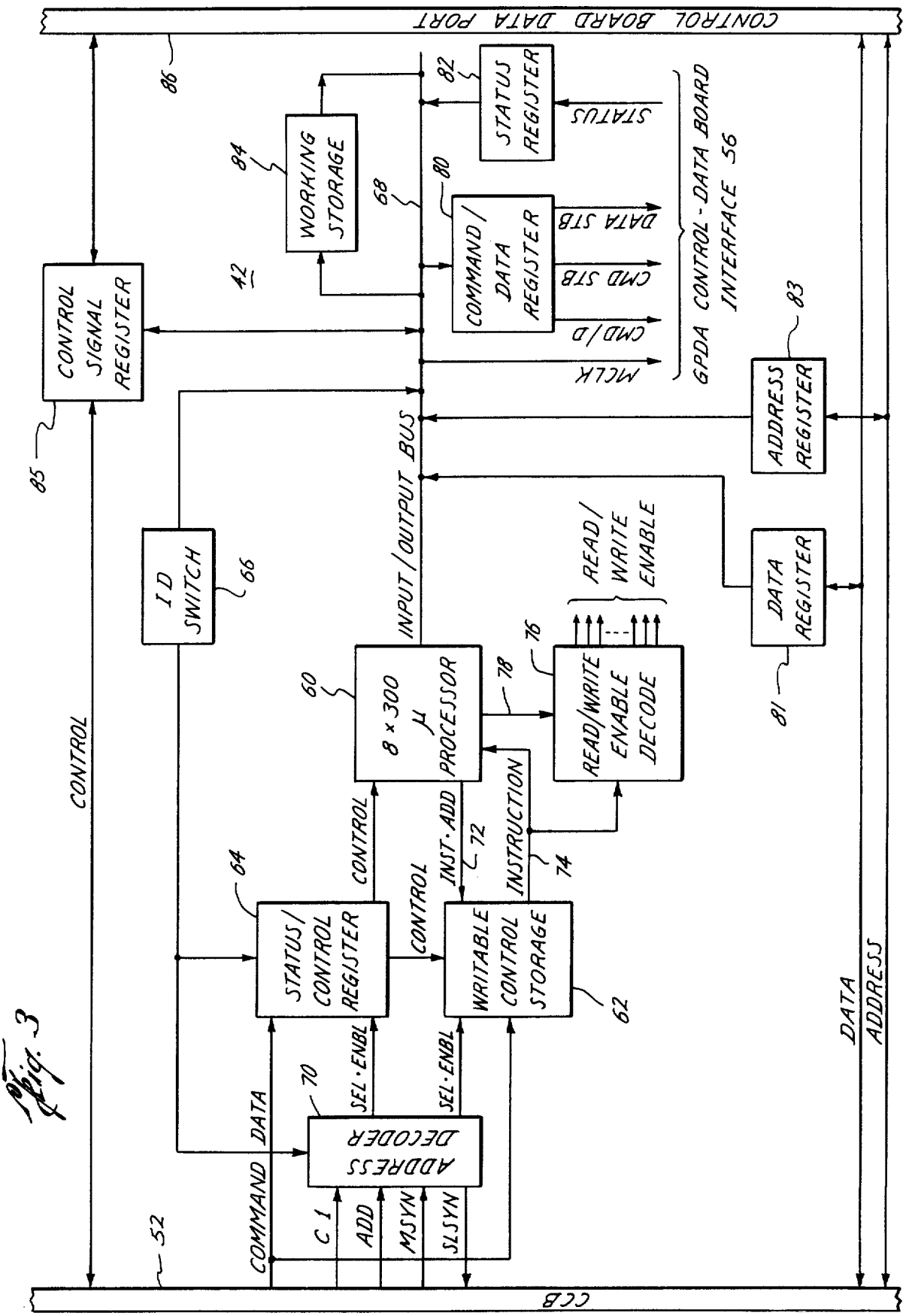
FIG. 3 is a detailed showing of the General Purpose Device Adapter control board.

Referring to FIG. 3, there is a detailed diagram of the GPDA control board: The heart of the GPDA is a bipolar microprocessor 60 which is a 8×300 microprocessor. This device and its associated control logic, interface to CCB 52, completely control the sequence of events within the two boards such as 32, 42 comprising a complete GPDA. The main purpose of the GPDA control board is to act as an intelligent control interface between the CCB and a device to be controlled. It also handles interrupts from the device interfaces to minimize interruptions of the SPS Supervisor.

In many instances the control board will have, attached to its control/data port 86, an interface that would normally connect directly to the CCB. It may in these instances be used to store strings of commands to be executed by the peripheral device in a conventional fashion without employing the special features of the DDA Bus. Such action would primarily be diagnostic in nature.

In some situations the GPDA control board will be the control interface between SPS Supervisor 14 and the device controller itself. Such is the case with a tape system. When connected to the tape system, the GPDA control board will issue commands to the tape formatter/controller and monitor status reported back. It can then issue interrupts to the SPS Supervisor under chosen conditions. It should be understood that each device includes a dedicated controller/formatter that is an integral part of the device and it should not be confused with the GPDA control board.

Besides sending the commands and control parameters to the device (or device interface), the GPDA control board also sends the data transfer commands and parameters to the data board. The data board interprets the commands, performs the requested operation, and reports back status to the GPDA control board.

The microprogram (firmware) for the GPDA is loaded into a writable control-storage (WCS) 62 sometime after power is applied to the system. The GPDA control board 42 can do nothing until the firmware is loaded.

The WCS is a random access memory device to store the sequence of instructions making up the firmware. Changes in the firmware are easily made by reloading or modifying the data in the writable control-storage.

In addition to storing the 16-bit instructions for the 8×300, the writable control-storage stores a seven-bit field that is used for enabling registers associated with the input/output bus of the 8×300.

Each instruction includes a parity bit. Hardware in the control board 42 checks parity for each instruction as it is executed to assure that odd parity is maintained in the instruction word. If a parity error is detected, a bit in the status/control register 64 will be set, and will remain set until a system reset is applied or until the 8×300 itself is reset.

The writable control-storage 62 consists of 1024, twenty-four bit words of memory. To simplify the loading of firmware, the writable control-storage is treated as though the instructions are 32 bits wide, with the upper 8 bits always zero. Writable control-storage 62 is loaded by the SPS Supervisor by first enabling it into CCB I/O space. This is done by setting the proper bit in status/control register 64. When enabled into CCB address space each instruction takes two consecutive words. In order to conserve address space, only a portion (one fourth) of the writable control-storage is enabled at a time. The block of writable control-storage to be enabled is selected by two bits in the status/control register. By enabling it in blocks, the writable control storage takes up only 512 words of I/O space. The writable control storage 62 of only one GPDA can be enabled at a time, because all of the writable control-storage modules in the system share the same address space.

Each GPDA (excluding writable control-storage 62) is addressed with 32 words of consecutive CCB address space. With no firmware loaded in a GPDA control board, only the 16-bit status control register 64, is accessable within that GPDA's address space.

Sixteen different non overlapping regions of SPS Supervisor address space are available to the GPDA. Selection of the region to be used is selected by a manually operated sixteen-position ID switch 66. This switch selects a unique address for each GPDA in the system. The address decoding circuitry 70 on the control board furnishes the read and write strobes for the status control register and the writable control-storage. It also furnishes a logic signal, accessable by the firmware, that indicates that an address is present on the CCB that falls within the unique address region allocated to this particular GPDA.

The status/control register 64 receives all commands governing the operation of the GPDA control board hardware. It reports back status pertaining to the hardware. Some of the bits in the status/control register are read or written by the firmware. The low order eight bits in the register are read/write command bits. The upper eight bits are the status bits. The functions of the 16 bits are defined as follows:

b0: RUNH, active high. When high, 8×300 is allowed to run. When low the 8×300 is halted.

b1: ENABLE INTERRUPTS, active high. When high, hard and soft interrupts to the SPS Supervisor processor are normally enabled.

b2: ENABLE BUSES, active high. Must be high in order to enable any component other than the status/control register (SCR), write writable control-storage data onto the CCB, or control signals onto the Data Port.

b3: SELECT MICRO, active low. When low the Writable Control Storage (WCS) is addressed by the 8×300. When high the WCS is mapped into the WCS portion of CCB I/O address space. Also the 8×300 is reset whenever SELECT MICRO is high.

b4: MAP SELECT: bit 0. In conjunction with b5, a block of the WCS is specified for mapping into CCB address space.

b5: MAP SELECT bit 1.

b6: GPFDIN. General Purpose Firmware defined input. This bit can be sampled by the firmware at any time. It is a read/write bit in the SCR register, but is read only to the firmware.

b7: GPFDIN. Same as b6.

b8: ID0. In Conjunction with b9, b10 and b11, the GPDA unique address (0–15 set in a switch 66 in the GPDA) can be read.

b9: ID1.

b10: ID2.

b11: ID3.

b12: Unused

B13: GPFDOUT1. General purpose firmware defined output number one. This bit is set and cleared by the firmware. It is a read-only bit in the status/control register.

b14: GPFDOUT2. General purpose firmware defined output number two. This bit is set and cleared by the firmware. It is a read-only bit in the status/control register.

b15: WCS PARITY ERROR. Indicates that a parity error was detected in the writable control-storage. Reset by a CCB RESET or by setting b3 in the status/control register high.

Control signals associated with the input/output bus and read/write enable decoder 76 define a source and destination for data that is to be manipulated. Data manipulation instructions executed by microprocessor 60 include source, destination and operation code fields. Four clock cycles are required to perform an instruction. The first clock cycle defines a read operation from the source; the second clock cycle defines the operation to be performed; the third clock cycle addresses the destination; the fourth clock cycle defines a write operation to the destination device.

As mentioned earlier, the GPDA control board 42 through its firmware has control over up to sixty three signals that can be connected to the peripheral to be controlled. Interconnection between the GPDA control board and a peripheral device is accomplished across control board data port 86, FIGS. 1 and 3. Methods of control over these lines vary from one type of device to another and are conventional. Accordingly their use can only be described in broad terms. Many of these lines are primarily bypass links for diagnostic purposes.

1. Sixteen of these lines can be driven directly by the CCB data lines, or data can be loaded into a latch and enabled out onto these lines. Data can also be read from these lines for use in the program of the control board or the data can be enabled directly through to the CCB data lines.

2. There are eight other lines that can be used in the same way except that instead of being driven directly by the CCB data lines, they can be driven directly by the least significant six CCB address lines and C0 and C1, read/write control, on the CCB. Data can also be enabled directly onto these CCB lines.

3. Twelve of the lines can be driven directly only by the control board, read by the control board, or enabled onto the upper twelve (A06–A17) address lines of the CCB.

4. Twenty one of the lines can only be read by the control board. These are not bidirectional signals.

5. Two lines can only be written to by the control board. These are not bidirectional signals.

6. Three lines can be read or written to by the control board. These are bidirectional signals.

7. One line is the reset line. It can be set and reset by the control board.

Address decode logic 70, receives an address from ID switch 66 and, when a block of command data appears on CCB 52, decode logic 70 decodes the address. If a matching address is seen, the data block is routed to either status/control register 64 or to writable control-storage 62 in accordance with command C1. Ordinarily, of course, status/control register 64 must first be loaded in order to activate the GPDA control board. These functions were earlier described in greater detail in conjunction with the description of the DDA Bus Controller 16.

Command blocks are entered into writable control-storage 62. The command blocks contain a set of instructions to microprocessor 60 regarding control over the device to which the GPDA is connected. Unless the attached device is removed in favor of another, different device, the instructions are not changed, once the system has been initialized. Upon request over instruction address line 72, microprocessor 60 receives an instruction over instruction line 74. Leaving writable control-storage 62, the instruction words are 24 bits wide. Of these, 16 bits go to microprocessor 60 and 7 of the remaining 8 bits are decoded by read/write enable byte select decoder 76 to select the desired read/write enable byte. The 8th bit is a parity bit. A 4-bit line 78 from microprocessor 60 provides a control line for CLOCK and SELECT.

The GPDA control board 42 is interfaced with a data board 32 over interface 56. The interface includes a command/data register 80 and a status register 82. Eight of the previously-discussed interface lines lead to the status register from the GPDA data board 32, ten leave the command/data register and go to the data board and a master clock line sends clock pulses from the output Bus 68 to the data board.

A working storage 84 is interfaced to the output BUS for use as a utility memory. It is here that DCPs are stored for use by a peripheral device under control of microprocessor 60.

Data register 81, address register 83 and control signal register 85 are provided. These registers communicate bidirectionally between the input/output bus and the data, addres and control lines. Under control of microprocessor 60 and read/write enable decoder 76, these registers may serve several purposes. Data signal register 81 provides means for transmitting device parameters to the device attached to the GPDA. Typical commands might be READ, RITE, WEOF, ERAS, STOP, RWOL. (refer to the GPDA standard command table). These commands are transmitted via the control board data port 86 over one or more of the CCB command lines.

Address register 83 and data register 81 provide means for reading back commands loaded into working storage 84, and microprocessor 60 for error detection purposes. Data from the attached peripheral device can be read back for checking. Additionally the three registers data, address and control, can be used for diagnostic system tests and debugging.

It should be pointed out here, as before, that the "data" lines do not necessarily contain data that is to be processed such as is transferred between devices across the DDA Bus. Command and status words may be manipulated like true data by the host computer and the SPS Supervisor operating system, but except for diagnostic testing, actual data are not transmitted over that line.

GPDA Data Board

Figure 4:
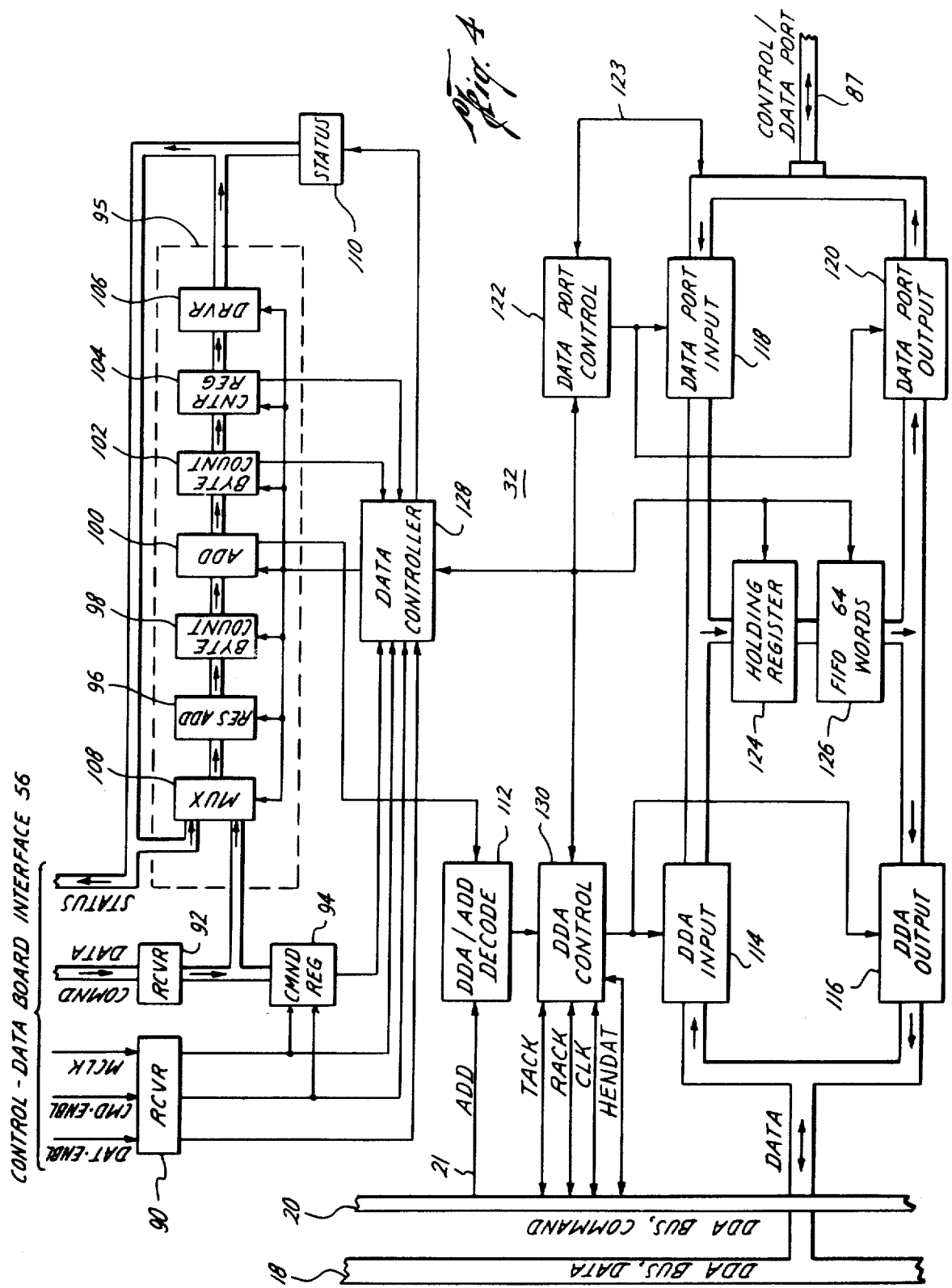
FIG. 4 is a detailed diagram of the General Purpose Device Adapter data board.

The purpose of the GPDA data board 32, FIG. 4, is to transfer data at a high transfer rate between peripheral devices across the data port and the Direct Device Access Bus. As pointed out before, the DDA Bus is a 32 bit wide data path capable of transferring data at an aggregate rate of 40 megabytes per second. The peripheral device may have a data path 8 bits, 16 bits or 32 bits wide. The control path of the device may have separate lines to the GPDA control board 42, or it may be time-multiplexed over the data lines. Physically, the data port is simply a connector to the GPDA data board. Re-formatting of data words to or from 32-bit parallel format is done by data-port I/O registers 118, 120 in a manner later to be described.

In general, data transmission across the DDA Bus occurs between a GPDA transmitter, and one or more GPDA receivers. The SPS Supervisor sends to all GPDAs that are to participate in a particular DDA Bus data transmission, the same DDA Bus transaction code and assigns a time slot for this transaction code on the DDA Bus. The time slot assignment is programmed into the DDA Bus Controller as previously described. When the DDA Bus Controller puts a code on the DDA Bus address lines, the previously-downloaded GPDAs will recognize the transaction code and transfer data across the DDA Bus. Additional time slots may be assigned for other transaction codes, and for each time slot, a different code is downloaded into a GPDA transmitter-receiver pair.

There are two important features attributable to the GPDAs. One is a multiple parallel data transfer process. Here, one transmitter can transfer data to several different devices in parallel.

Another feature of the GPDA is the capability for reading a long record from a peripheral device, subdivide the record into parts, and send each part to a different destination as complete records. This is called a split-record transfer or multiple serial destination transfer. To do a split-record transfer, for example to send parts of one record to two different destinations, one GPDA receiver is downloaded with DDA Bus transaction code A and a first byte count, another GPDA receiver is downloaded with DDA Bus transaction code B and another byte count. The GPDA transmitter is downloaded with both transaction codes A and B and both byte counts. The GPDA transmitter first recognizes address A, and for each word transferred across the DDA Bus to the receiver with address A, the byte counter, which is loaded with the first byte count is decremented by four (because there are four 8-bit bytes per 32-bit word). When the transmitter byte count reaches zero, the byte counter is loaded with the next byte count, and the transmitter starts recognizing address B. Data is then transferred to the receiver with address B. The process just described in the transmitter GPDA is defined as command chaining.

In the context of this disclosure, command chaining is the ability of the GPDA control board to access and activate successive hardware command structures without supervisor intervention.

Data chaining is the ability of the GPDA control board to reinitialize the byte count and the address register dynamically within a transfer without interrupting the physical record and without supervisor intervention.

The lines on the data port are shared by the GPDA control board and the data board. A description of how the data port lines are used by the control board has been discussed earlier. The data lines are connected to the data board although certain control lines also may be connected thereto depending on the particular device serviced. Some or all of the remaining control lines are connected to the GPDA control board.

The data board uses the data port lines to transfer data information only to and from the peripheral device, under the control of the GPDA control board. The data board connects to 8, 16 or 32 data lines as previously mentioned, depending on the data path width of the peripheral device to or from which data are to be transferred. Communication across the GPDA data board data port is asynchronous, i.e. every transfer takes place on a request-acknowledge basis. The data board receives data requests, and responds with data acknowledge over acknowledge line 123.

The GPDA data board consists of control/status registers, DDA Bus I/O registers, dataport I/O registers, memory and control to be described in connection with FIG. 4.

The receivers 90, 92 receive signals from the eight control lines, the data enable, command enable, and master clock. These lines form part of control-board data-board interface 56 and match with the corresponding lines of FIG. 3.

Command register 94, is an 8-bit register used primarily to load and read the data transfer parameters register 95, and to start and end a data transmission. It is also used to perform certain control functions which may be necessary while a data transfer is in progress.

Command bits in command register 94 have the following significance:

| Bit | Mnemonic | Meaning |
|---|---|---|
| 0,1 | CW0, CW1 | Command Word |
|  | 00 | Reset |
|  | 1 0 | Load parameters |
|  | 0 1 | Read parameters |
|  | 1 1 | Data Transfer enable |
| 2 | LBK | Last 64Kb block |
| 3 | SRR | Reset status register |
| 4 | LNP | Load new parameters |
| 5 | MRT | Multiple record transfer |
| 6 | CLN | Set cleanup |
| 7 | LWD | Set last word |

The data transfer parameters register 95 includes five registers, 96–104, an output driver 106 and an input multiplexer 108.

Output driver 106 puts the parameters register on the status lines during a parameters-register read for error-checking purposes and to determine the number of bytes read at the end of a data transfer operation. The data from each register may be sequentially circulated through the status lines by multiplexer 108. Seven clock cycles are required to complete the circulation and to restore register 95 to its original condition.

The control register 104 is used to set up the data board prior to a data transmission. Such things as data port width, parity configuration and transmitter-receiver identification are specified by this register.

Control bits in control register 104 have the following meanings:

| Bit No. | Mnemonic | Meaning |
|---|---|---|
| 0,1 | UW0, UW1 | Data port width |
|  | 0 0 | 8 bits |
|  | 0 1 | Not used |
|  | 1 0 | 16 bits |
|  | 1 1 | 32 bits |
| 2,3 | $\overline{UP0}$ $\overline{UP1}$ | Data port parity control |
|  | 1 1 | 32 bit parity |
|  | 1 0 | Not used |
|  | 0 1 | 16 bit parity |
|  | 0 0 | 8 bit parity |
| 4 | TID | Transmitter ID; |
|  | 0 | Transmitter |
|  | 1 | Receiver |
| 5 | LSF | Least Significant byte first |
|  | 0 | MSB first |
|  | 1 | LSB first |

Byte counter 102 is loaded with the desired byte count of a record to be transferred, and with each 32 bit word input to the data board, it is decremented by four. When the byte counter reaches zero, data transfer to the data board is finished.

The address register 100 is loaded with the transaction code that the GPDA data board is to recognize on the DDA Bus address lines for the current data transmission.

Byte count register 98 contains the byte count for a subsequent record of a split-record transfer. This byte count is transferred to byte counter 102 when that byte counter reaches zero in the presence of a split-record transfer.

Reserve address register 96 contains the DDA Bus transaction code for the next record of a split-record transfer. This code is transferred to address register 100 when the byte counter 102 reaches zero during the current transfer.

As soon as parameters from registers 98 and 96 have been moved to registers 102 and 100 respectively, new parameters may be entered. By this means, a continuous series of split-record transfers or command chaining operations involving device control functions, may be effected. The chaining ceases only when a STOP code issues.

Status register 110 relays data board status back to the control board. The information includes status bits defining parity error status, whether the FIFO is full or empty, when the byte counter reaches zero and when the last byte has been transferred from the data board.

Status bits in status register 110 have the following significance when true:

| Bit | Mnemonic | Meaning |
|---|---|---|
| 0 | TED | Transmitter End Data |
| 1 | CHE | Channel Empty |
| 2 | FFL | FIFO full |
| 3 | FMT | FIFO empty |
| 4 | PE0 | Parity error, output |
| 5 | PE1 | Parity error, input |
| 6 | ZLC | Zero longword count |
| 7 | ATN | Status attention |

DDA Bus transaction-code decoder 112 compares information in the address register with information on the DDA Bus address lines. When there is a match, the DDA Bus control is triggered to initiate a data transfer.

There are four, 32-bit wide I/O registers, 114–120 and a 4-bit parity register (not shown). Included are DDA Bus input register 114, DDA Bus output register 116 data-port input register 118 and data-port output register 120.

All data transfer paths within the GPDA data board are 32 bits wide plus parity. Incoming data across the data port may be 8, 16, or 32 bits wide. If the incoming data word is less than 32 bits wide, say only 8 bits, then the first 8-bit word of the incoming data are parallel loaded in the first of the 8-bit positions of data port input register 118. As the second 8-bit word arrives, data port control 122 parallel pads the next 8-bit positions of the data port input register. The process is continued until all 32 bits have been loaded. The reverse process occurs at data-port output register 120, i.e. all 32 bits are parallel-loaded into the register from the FIFO and are transmitted to the device 8 bits at a time.

Holding register 124 is a 36-bit register (32 bits plus 4-bit parity) which accepts data from one of the input registers, and presents it to the FIFO. If the GPDA is a transmitter, the holding register gets data from the data port input register; if the GPDA is a receiver, the holding register gets data from the DDA Bus input register. The holding register is necessary for isolation between the data port and the FIFO because of the relative slowness of the FIFO. Data must be held static on the FIFO inputs while data are being transferred from the data port.

FIFO 126 is a 36-bit wide, 64-word deep first in, first out buffer memory. Its purpose is to synchronize irregularities in the data transfer rates of various peripheral devices. It accepts data from holding register 124, and passes it on to one of the output registers. If the GPDA is a transmitter, the FIFO transfers data to DDA Bus output register 116; if the GPDA is a receiver, the FIFO transfers data to the data port output register 120.

The data-board controllers include the data controller 128, the DDA Bus control 130 and the data-port control 122.

Data controller 128 accepts control information from command register 94, byte counter 102 and control register 104. Data Controller 128 controls the direction of data transfer through data board 32, the loading of holding register 124 and the FIFO 126 and reports status to the GPDA control board 42. It also controls the loading and reading of the data transfer parameters register 95. It does not however, control the loading of the command register 94; this is done directly by the control board 42, FIG. 3.

DDA Bus control 130 accepts control information from the data controller 128 and from the DDA Bus transaction code decoder 112 in response to the transaction code appearing on DDA Bus control lines 20. It controls the loading of the DDA Bus I/O registers 114, 116 and passes transmit or receive acknowledge signals to the DDA Bus. It also passes status information back to the data controller 128.

Data port control 122 accepts control information from the data controller 128 and from the data port. It controls the loading of the data port I/O registers 118, 120. It also passes status information back to the data controller 128.

Data Transfer Timing

Figure 5:
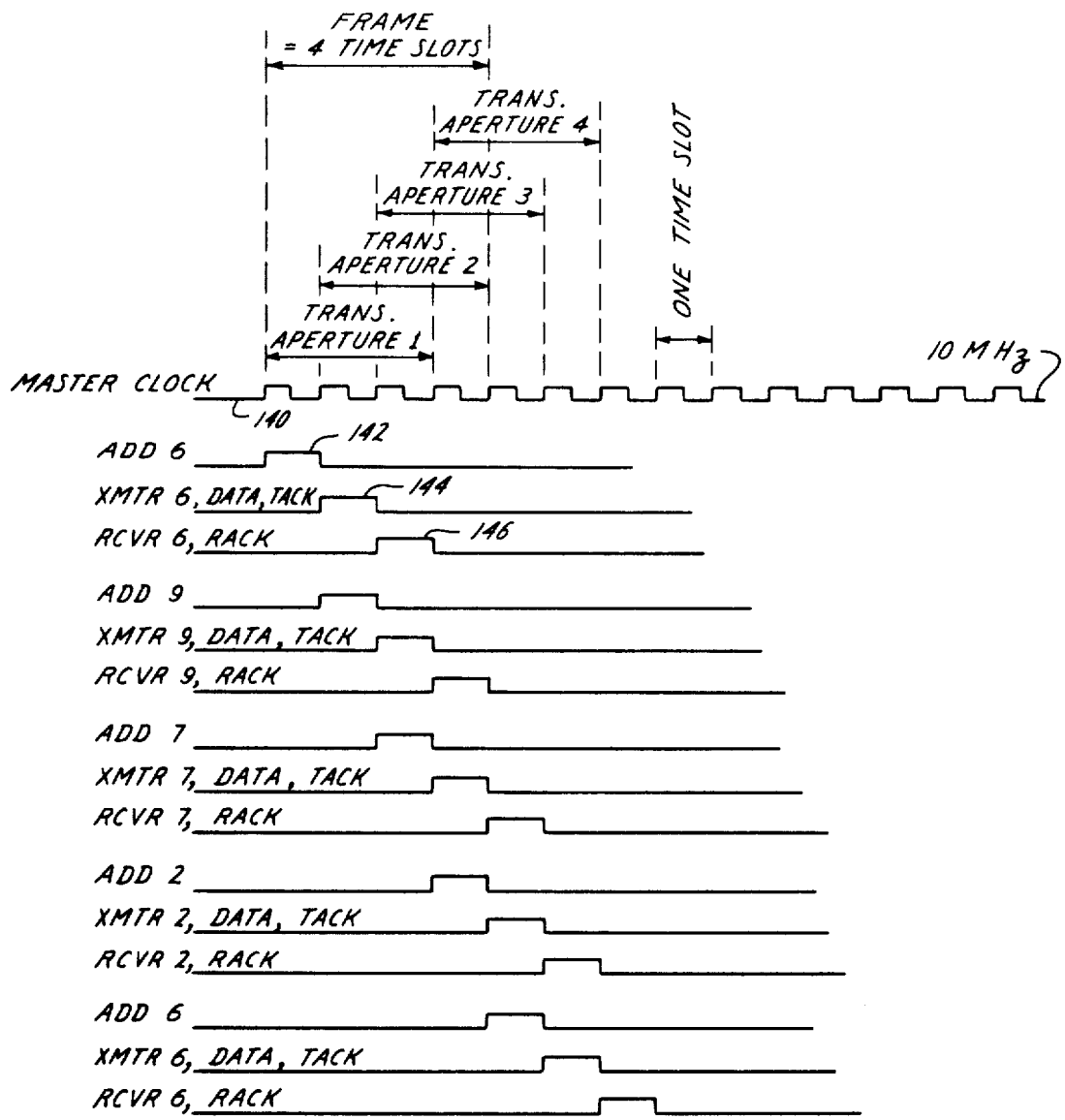
FIG. 5 is a timing diagram illustrating the timing of events involving parallel multiple device-to-device data transfers.

Data is transferred between devices during a 300-ns transaction aperture. Master clock pulses at 10 MHz are provided by DDA Bus controller 16, FIG. 1, providing 100-ns time slots. Referring now to FIGS. 1, 4 and 5, during the first time slot of a transaction aperture, DDA Bus controller 16 places a transaction code on the address line of DDA command Bus 20. The transmitter device and the receiver device(s) to which that transaction code was assigned receive and decode the transaction code in DDA address decoder 112. At the next time slot, the transmitter, if it is ready to transmit, places a 32-bit data word from DDA output register 116 on the data lines 18 of the DDA Bus and drives transmit acknowledge (TACK) on the TACK command line in Bus 20. The receiver GPDA(s) latch the data into the DDA input register 114 and recognize TACK. At the last time slot, the receiver GPDA(s), if ready to receive data, releases receive acknowledge (RACK). All of the receivers, if more than one release RACK. When all of the receivers recognize RACK they transfer the data from DDA Bus input register 114 into holding register 124. The GPDA transmitter recognizes RACK and transfers the next data word from FIFO 126 to DDA Bus output register 116.

The timing relations are illustrated at the top four lines of FIG. 5. The first line 140 represents the 100-ns time slots. The transaction code 6, assigned to a designated transmitter and receiver is transmitted at the first time slot as shown by pulse 142. During the next time slot 144, data and TACK are transmitted. At the last time slot 146, TACK is recognized, data are received and RACK is released. When RACK goes true the data transfer is complete and the transmitter and all of the receivers, if more than one, move data at the same time. If RACK does not go true, the receivers do not transfer data from their DDA Bus input registers into their holding registers and the transmitter puts the same data on the Bus when the transaction code is again recognized.

Multiple data transfers may take place concurrently as shown by the timing diagrams corresponding to transaction codes 9, 7 and 2. Where data are to be transferred between more than one pair of transmitter-receiver devices, DDA Bus controller 16 assigns a time slot and a transaction code to each device pair. It is to be understood of course, that the term "device pair" may consist of a transmitter and one or more receivers, which, as a whole, constitute a set of devices. As soon as the transaction code for the first device pair such as 6 has been transmitted, another transaction code may be sent such as code 9, during the first time slot of transaction aperture 2 as shown in the timing diagrams. The process continues for transaction codes 7 and 2 during transaction apertures 3 and 4. Accordingly, in the example of FIG. 5, four transactions are taking place concurrently. In this example, the frame time is four time slots wide.

Transaction apertures, within a frame are numbered consecutively for convenience. That numbering should not be confused with the DDA Bus transaction codes for devices to be serviced during a particular time slot. For example, in FIG. 5, it is seen that transaction apertures 1, 2, 3, 4 have assigned to them transaction codes 6, 9, 7, 2 respectively. A frame contains all of the time slots assigned by DDA Bus Controller 16 at a particular point in time.

Time slot allocation is dynamic. That is, they are programmed into and are allocated by the DDA Bus Controller as required. They may be added to or removed from the frame as needed. Thus the frame width is variable, thereby making more efficient use of the DDA Bus. For example, when all of the data in a transaction for transaction code 9 have been transferred, time slot 2 is closed, making the frame three slots wide.

The example of FIG. 5 involves data transfers between four separate device pairs. Data could be transferred between a single pair of devices, of course, by repeatedly placing the same transaction code on the address line for every second time slot. Because of the system protocol the minimum frame width is two time slots.

A preferred mode of operation of the system is best shown by way of an example. Assume that 10000 bytes of data are to be transferred from a 9-track magnetic tape to an array processor.

The system is first initialized by downloading the firmware to the involved GPDAs from the host computer through the SPS Supervisor. A conventional utility program is employed for this purpose. The microprocessors 60 now have available instructions for operating the tape drive and array processor respectively.

A transaction command packet is now to be encoded and presented to the host computer for transmission to the SPS Supervisor as follows:

| PACKET | VMSPID | ; Computer process ID |
|---|---|---|
|  | 37 | ; 37 words in the packet |
| SCP TYPE 1 | 1#245+1 | ; ID word for the first type 1 SCP |
|  | MNA+APA | ; Devices to use: MNA=tape, APA=array processor |
|  | MNA | ; Device to start |
| SCP TYPE 2 | 1#256+2 | ; ID word for first type 2 SCP in the packet |
|  | NOMORE | ; Only one type 2 SCP |
|  | NOCHAIN | ; |
|  | SCP4 | ; Activate a Type 4 SCP |
|  | 0 | ; Use count; SCP type 2 is used ; Only once |
|  | NOERROR | ; Ignore errors |
|  | MNA#256+0 | ; Use tape unit #0 |
|  | NOERROR | ; Ignore errors |
|  | 10,000 | ; Transfer 10000 bytes |
|  | 4 | ; 4 bytes of parameters; each parameter uses two bytes |
|  | READ | ; Read tape |
|  | 10000 | ; Byte count |
|  | APA#256+0 | ; Use Array Processor 0 |
|  | NOERROR | ; Ignore errors |
|  | 0 | ; There are no bytes to be ignored before starting to transfer |
|  | 8 | ; eight bytes of parameters |
|  | RDMA | ; Receive data in a direct memory ; access mode(DMA) |
|  | 0 | ; Start at location 0 in array processor |
|  | 10,000 | ; Byte count |
|  | CTRL | ; Control bits for DMA |

-continued

| SCP TYPE 4 | 1#256+4 | ; ID word for first type 4 SCP |
| | UCTERM | ; Terminate on use count for |
| | SCP2 | ; this SCP type 2, |
| | SCP3 | ; then activate a type 3 SCP |
| | ∅ | ; and use it only once so |
| | 1 | ; terminate when the use count of the type 3 SCP is 1. |
| SCP TYPE 3 | 1#256+3 | ; ID word for the type 3 SCP |
| | ∅ | ; GO-NOGO code |
| | 8 | ; Eight bytes of status |
| | MNA | ; Tape status goes |
| | ∅ | ; Here |
| | APA | ; APA status goes |
| | 0 | ; Here. |

The above transaction is sent to the SPS Supervisor 14 by host computer 10 using a conventional driver program.

If the Supervisor has room in its transaction packet buffer for the 37 words of the TCP, the transaction packet is accepted and awaits activation. During idle time, an operating program in the SPS Supervisor scans the transaction buffer for pending transactions that may be activated. In this case, the transaction may be activated as soon as magnetic tape controller, unit ∅ and array processor controller, unit ∅ are free.

Once the transaction has been cleared for activation, a set of device queues are set up for each of the two involved controllers. Two device queues are needed, one for the tape and one for the array processor. The device queues include pointers to the SCPs in the transaction packet buffer that will be involved in this transaction.

The next step is to assign a time slot for the transaction and a DDA Bus transaction code. The SPS Supervisor 14 first requests from the DDA Bus controller 16 the number of the next available time slot. Let us assume that time slot 7 is next available. The transaction code may be arbitrarily assigned by the SPS Supervisor, but from a practical standpoint, the unit address of the receiver as selected by ID switch 66, FIG. 3, is assigned as a transaction code to both the magnetic tape unit and the array processor for a particular transaction. Note that, the device unit number is not necessarily the same as the GPDA unit address. There may be, for example, several unit devices such as 0, 1, 2, 3, all connected through a device controller to a GPDA whose unit address may be 6. In our example, let us assume that the GPDA connected to the receiving array processor has a unit address of 2. Accordingly SPS Supervisor assigns to the DDA controller 16 a transaction code of 2 to be entered in address encoder 39, FIG. 2. This code will be activated at time slot 7 from RAM 39.

Once the DDA Bus controller is set up, the required DCPs are generated by the SCP/DCP transformer resident in SPS Supervisor 14. The device queues are then sent to the working storage 84, FIG. 3 over CCB 52. The Device Command Packets are:

| DCP for tape | 5∅∅∅∅ ∅ | ; Read command(5000) for unit ∅ |
| | 10,∅∅∅ | ; Byte count |
| DCP for array processor | 2 | ; Do a DMA data-transfer write operation |
| | ∅ | ; to location ∅ in the array processor |
| | 25∅∅ | ; There are 25∅∅ four-byte words ; into the array processor. |

-continued

| 1∅∅∅1 | ; These are control bits. |

Now, since each GPDA control board has all of the necessary parameters for conducting, the data transfer, the various registers in the GPDA data boards can be loaded.

GPDA control board 42 places on the command-/data lines a command to load the data transfer parameter register 95, and sends a command strobe. This loads the command into command register 94.

The GPDA control board then places seven bytes of data transfer parameters on the command/data lines, sending a data strobe with each byte. The data transfer parmeters include:

1. One byte containing control information, such as data port width (8, 16, or 32 bits wide); data port parity configuration and a transmitter identification bit that tells the GPDA data controller 128 that it is to transmit onto, or receive from the DDA Bus.

2. Two bytes containing data byte count.

3. One byte containing the transaction code.

4. Two bytes containing the data byte count for a second receiver, if any, and

5. One byte containing a transaction code for a second destination, if any.

The data transfer parameter register 95 may be read by the control board 42 by loading a read-parameters command into the command register 94 and sending seven data strobes. The information thus read may be compared with the information that was intended to be loaded. The data transfer parameters register 95 restores itself to the initial condition after the seventh data strobe.

A command word is sent from the GPDA control board 42 to the GPDA data board 32 to start a data transfer. For the GPDA receiver, that is the array processor, the following events take place:

1. Data controller 128 starts looking for its transaction code on the transaction code lines 21 from DDA Bus 20.

2. Upon recognizing its transaction code, data controller 128 loads a 32-bit word from the DDA Bus data lines at the next clock cycle into its DDA Bus input register, and looks for TACK.

3. If TACK does not go true, the controller waits until it see its code again. If TACK does go true, it releases RACK and looks for RACK to go true at the next clock cycle. If RACK does not go true (i.e. if another receiver does not release RACK to go true), it waits until it is addressed again by the assigned transaction code. If RACK does go true, data are then transferred from the input register 114 to the holding register 124 where it is presented to the 64-word FIFO 126. Byte counter 102 is decremented by four, (because the data word contains four bytes) and the controller starts looking for its transaction code on the DDA Bus for the next word.

4. After FIFO 126 has accepted data from the holding register 124, it indicates to data controller 128 that holding register 124 is empty.

5. Meanwhile, the first data word passes through FIFO 126, and when it appears on the FIFO outputs, data is loaded into the data port output register 120. FIFO 126 continues to fill up. When it is full, data controller 128 signals the control board 42 that data are ready to be sent to the peripheral device. Data controller 128 then starts looking for master SYNC from the array processor, indicating that the device is ready to accept the first data word.

6. Upon receiving master SYNC, the data control board sends the first 16 bit word and responds with slave SYNC. Upon receiving the second master SYNC, the data controller responds with slave SYNC, and transfers the next 32-bit data word from the FIFO outputs, if it is ready, to the data port output register.

7. Data is transferred from the DDA Bus to the array processor in this manner until the byte counter 102 reaches zero, indicating the last word is loaded into holding register 124. At this time data controller 128 stops recognizing its transaction code on the DDA Bus.

8. A last-word indicator bit is transferred to the FIFO 126 along with the last data word, and when this bit appears on the FIFO outputs, it is used to set an end data flag when the last data word is loaded into the output register.

9. When the last word of data in output register 120 is transferred to the peripheral, a channel empty-status bit is sent to the GPDA control board 42.

For the GPDA transmitter, that is the magnetic tape, the following events take place:

1. Data controller 128 immediately starts looking for its transaction code on the transaction code lines 21 of the DDA Bus, but does not transfer any data since FIFO 126 has not yet been written into, that is, the transmitter is not ready.

2. The data controller starts looking for master SYNC from the tape controller, indicating the presence of data on the data port lines.

3. Upon recognizing master SYNC, data controller 128 loads data into its data port input register 118, responds to the tape controller with slave SYNC, and decrements byte counter 102 by one, two, or four bytes, depending on the width of the data port which in this case is one byte.

4. When the data port input register has been loaded with four bytes of data, data are transferred from input register 118 to the holding register 124, if empty, where it is presented to the 64-word FIFO inputs, and the data controller 128, continues looking for master SYNC.

5. After FIFO 126 has accepted the data from the holding register, it indicates to data controller 128 that the holding register 124 is empty.

6. Meanwhile, the first data word passes through the FIFO, and when it appears on the FIFO outputs, it is loaded into the DDA Bus output register 116, making the GPDA transmitter ready to transmit data over the DDA Bus 18.

7. Upon recognizing its transaction code on the transaction code lines, the controller places data from DDA Bus output register 116 onto the DDA Bus data lines 18, drives the TACK line true, and looks for RACK to go true at the next clock cycle.

8. If RACK does not go true, controller 128 looks for the transaction code to again appear on the transaction code lines 21. If RACK does go true, the controller 128 transfers the next word of data from the FIFO, if it is ready, to the DDA Bus output register, if it is empty, and continues looking for its transaction code on the transaction code lines. If FIFO 126 is not ready, the controller waits until it becomes ready, then transfers the next word from FIFO 126 to the DDA Bus output register 116 and waits until it sees its transaction code again on the DDA Bus.

9. Data are transferred from the magnetic tape to the DDA Bus 18 in this manner until the byte counter 102 reaches zero, indicating the last byte is loaded into the data port input register 118. Byte count zero status is sent to the GPDA control board 42.

10. When the byte count is zero, data are transferred from the data port input register 118 into the holding register 124, and the last word indictor bit is set, which is presented to the FIFO inputs along with the last word of data.

11. The last word indicator bit on the FIFO output causes the end-data flag to be set as the last word is loaded into the DDA Bus output register 116.

12. Channel-empty status is sent to the GPDA control board 42 when the last word is transferred onto the DDA Bus.

When end of channel status is received from the data controller 128, the DDA Bus Controller 16 places a reset command on the command/data lines, and sends a command strobe. This resets the GPDA control board, and ends the data transmission.

When the entire transfer is complete, the GPDAs generate interrupts to the SPS Supervisor to inform it that the data transfer has been completed. At that time, the type 4 SCP is decoded. Since a use count termination was selected and the type 2 SCP as used once, the type 3 SCP is activated which sends a status report back to the host computer.

The preferred method of operation may be further better understood by reference to simplified flow diagrams for programing the transmitter and receiver GPDA boards.

Figure 6:
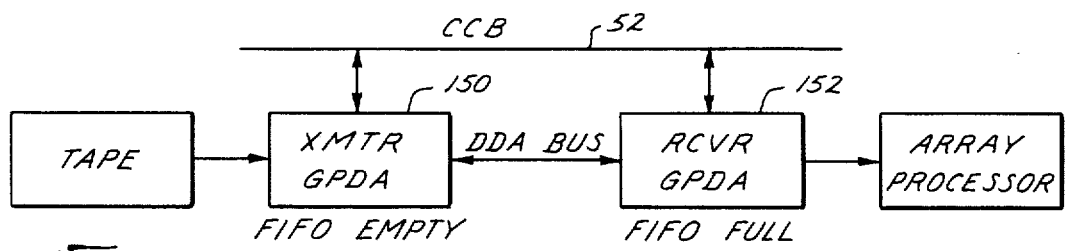
FIG. 6 shows the relationship between a transmitter-receiver pair of GPDAs.

FIG. 6 reviews the relationship between the tape (transmitter) GPDA 150 and the receiver (array processor) GPDA 152. Both units receive orders over CCB 52 and communicate directly with each other over the DDA Bus. In operation, the timing of events is such that the 64-word FIFO, such as 126, in transmitter GPDA 150 is always empty while the corresponding FIFO in the receiver GPDA 152 is always full. This condition furnishes a small amount of elasticity to the system. The tape for example, transfers out data on a per byte basis. However, the array processor receives data in 16-word blocks. Hence, the 64-word FIFO provides a means for accumulating a 16-word block without hindering the data transfers of the tape GPDA.

Figure 7:
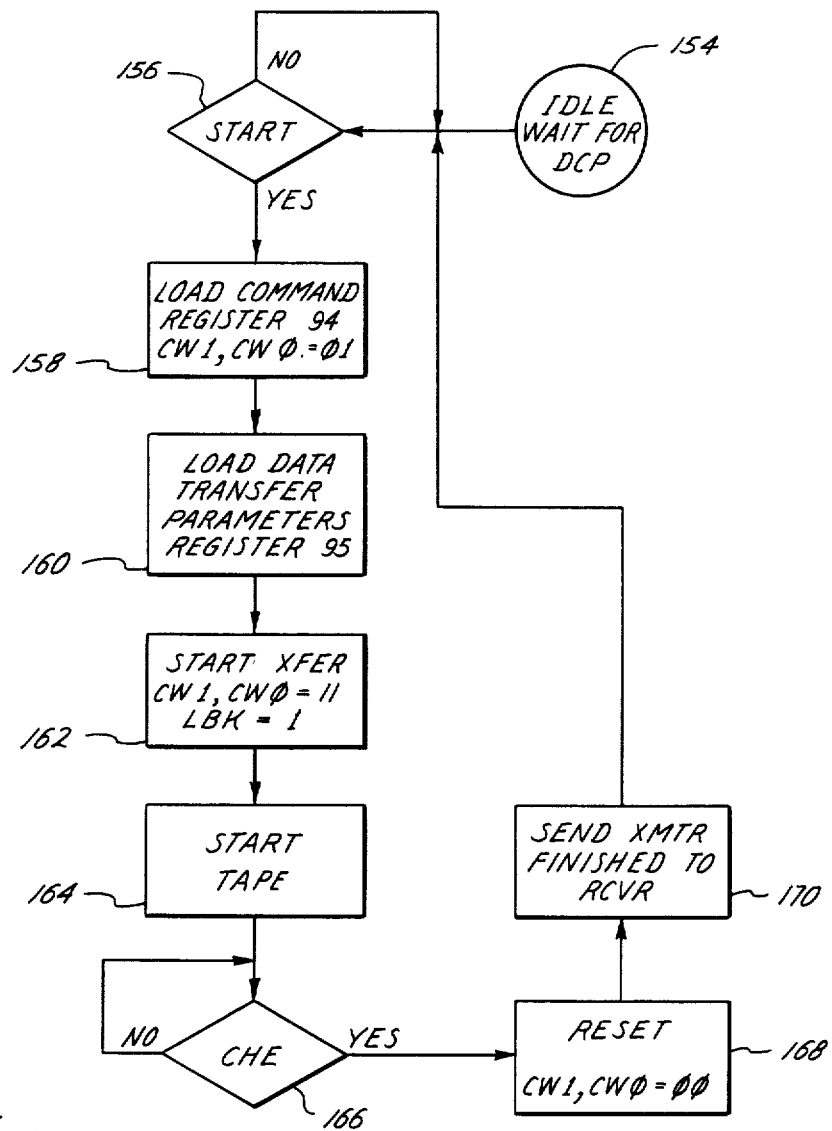
FIG. 7 is a simplified flow diagram of the sequence of events that take place in the transmitter GPDA of FIG. 6.

FIG. 7 is a flow diagram of the sequence of events that take place in the transmitter GPDA 150. In the IDLE state 154 the GPDA is awaiting the arrival of a DCP. Upon receipt of a DCP and a state command at step 156, command register 94 (FIG. 4) is loaded with a load command to load the data transfer parameters register 95, by setting bits CW1 and CW0 to 01 at step 158. At step 160 register 95 is loaded with the necessary transaction code, byte count and control bits. In step 162, LBK, last 64-Kbyte block, is set because only 10,000 bytes are to be transferred. The transfer is started by setting CW1, CW0 to 11. In step 164, the tape is started and data are transferred across DDA Bus 20 until CHE, channel empty, state occurs. Upon receipt of CHE from the status register, GPDA 150 is reset by setting CW1, CW0 to 00 in step 168. Finally in step 170, a signal is sent to the receiver over CCB 52 that the transmitter is finished.

Figure 8:
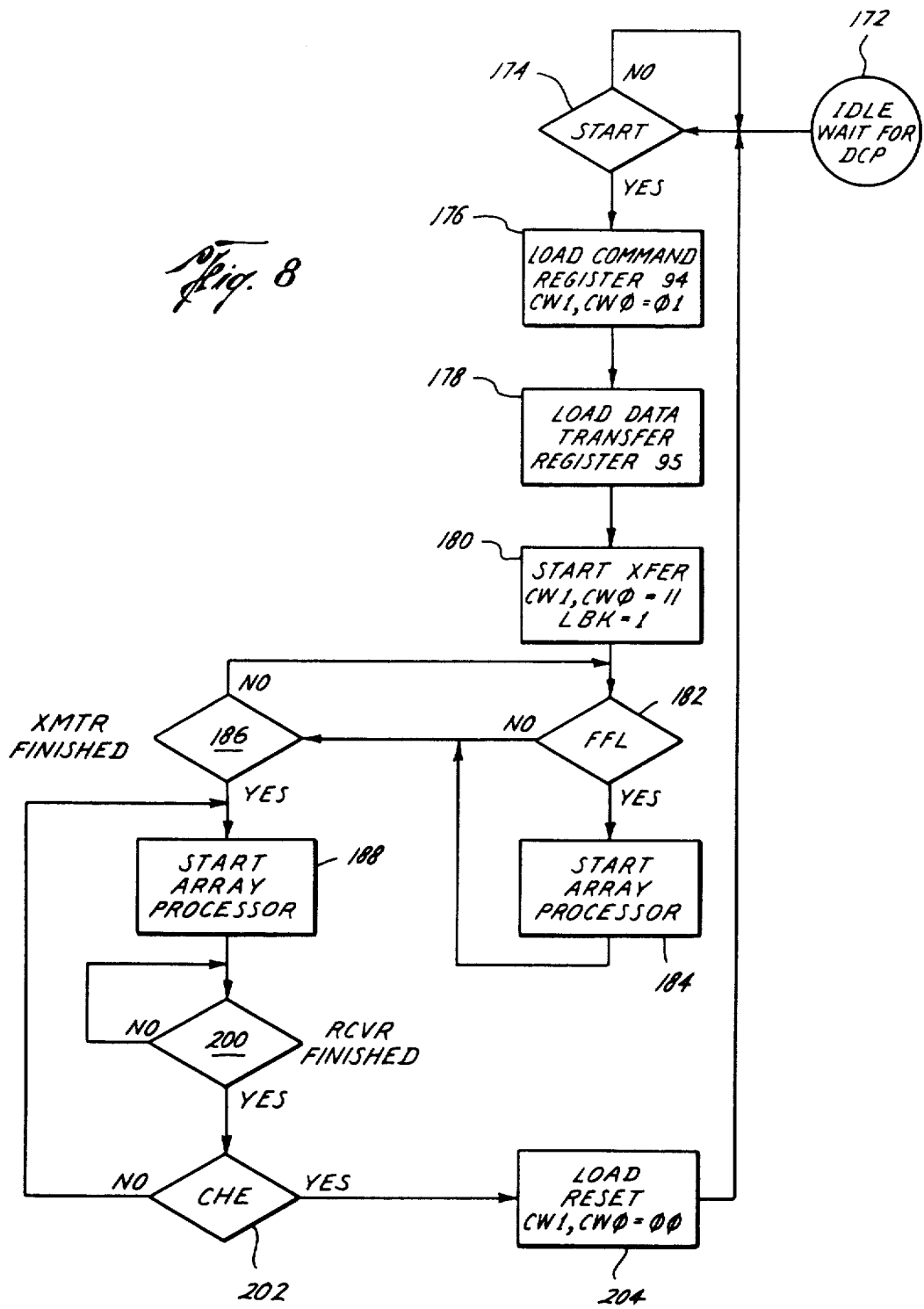
FIG. 8 is a simplified flow diagram of the sequence of events that take place in the receiver GPDA of FIG. 6.

FIG. 8 is a simplified flow diagram of the sequence of events that take place in the receiver GPDA 152. Steps 172–180 correspond to steps 154–162 shown in FIG. 7. At step 182, the receiver GPDA waits until the 64-word FIFO, such as 126, FIG. 4, is full before starting the array processor assuming, of course that the transmitter is not finished, step 186. Once the FIFO is full, data transfers take place at step 184 until the XMTR finished signal is received from transmitter GPDA 150 over the DDA Command Bus 20. It will be remembered that the receiver FIFO holds sixty four words and therefore it is still full after the transmitter finishes. Accordingly, steps 188-202 take place in order to empty the FIFO. Since the array processor receives data in 16 word blocks, the FIFO will be emptied at the fourth cycle and CHE will go true, causing the system to reset at step 204, whereupon both transmitter and receiver revert to the IDLE state.

Other modifications and embodiments may be made by those skilled in the art without departing from the scope and teachings of this disclosure which is limited only by the appended claims.

I claim as my invention:

1. A data processing subsystem associated with a host computer, said host computer including means for assigning processing tasks to said data processing subsystem by generating a queue of transaction command packets, comprising:

a supervisor for receiving from said host computer transaction command packets, said transaction command packets consisting of a plurality of supervisor command packets, selected in accordance with separate assigned processing tasks to be performed, into a plurality of device command packets;

a plurality of peripheral devices characterized by different personalities but having equal priority;

a direct device access bus, including a set of data lines for providing data pathways directly between said peripheral devices for parallel transfer of data, and including a set of command lines;

a command control bus coupled to said supervisor;

a plurality of programmable general purpose device adapters for respectively interfacing each said peripheral device in parallel, with the data lines of said direct device access bus;

a decoder associated with each said programmable general purpose device adapter, each said decoder being coupled in parallel to said direct device access bus command lines;

a register means in each said programmable general purpose device adapter, interconnected with the associated decoder and coupled to said command control bus, for receiving device command packets from said supervisor over said command control bus, the device command packets having been selected by said supervisor according to a process task to be performed by selected interfaced peripheral devices, the device command packets including a unique transaction code for identifying a peripheral device as being a member of a particular one of several different sets of peripheral devices, a separate transaction code being assigned to each different peripheral device set and the same transaction code being assigned to all of the members within a particular set;

a bus controller interconnected between said supervisor and the command lines of said direct device access bus;

means, in said bus controller, responsive to commands from said supervisor, for applying, at overlapped timed intervals, respective transaction codes to the decoders over the command lines of said direct device access bus so that, when a transaction code is received by the decoders that are associated with the programmable general purpose device adapters which are interfaced with members of the respective peripheral device sets, matches the transaction code received by the corresponding register means over the command control bus, data pathways are enabled by the programmable general purpose device adapters, over the data lines of said direct device access bus between individual members of the respective peripheral device sets to allow substantially concurrent, direct, parallel data-transfers therebetween as required for the performance of the separate assigned processing tasks, independently of the host computer.

2. The improved data processing subsystem as defined by claim 1 wherein:

one of the members of each set of peripheral devices is a data transmitter device.

3. The improved data processing subsystem as defined by claim 2 comprising:

at least one set of peripheral devices which includes a plurality of data receiver devices; and register means included within the device adapters associated with said data receiver devices for enabling transfer said data directly between said transmitter device and said plurality of data receiver devices in parallel-multiple-record transfer mode in response to a selected device-command packet.

4. The improved data processing subsystem as defined by claim 2 comprising:

at least one set of peripheral devices which includes as its members a plurality of data receiver devices; and register means included with the device adapters associated with said data receiver devices for enabling direct transfer of data between said plurality of receiver devices in a desired sequence in a serial split-record transfer mode in response to selected device command packets.

5. The improved data processing subsystem according to claim 2 wherein:

one said peripheral device is a demultiplexing memory.

6. The data processing subsystem as defined by claim 1 wherein said bus controller initiates a second direct transfer of data before completion of an immediately previous direct transfer of data.

* * * * *